Figure 1:
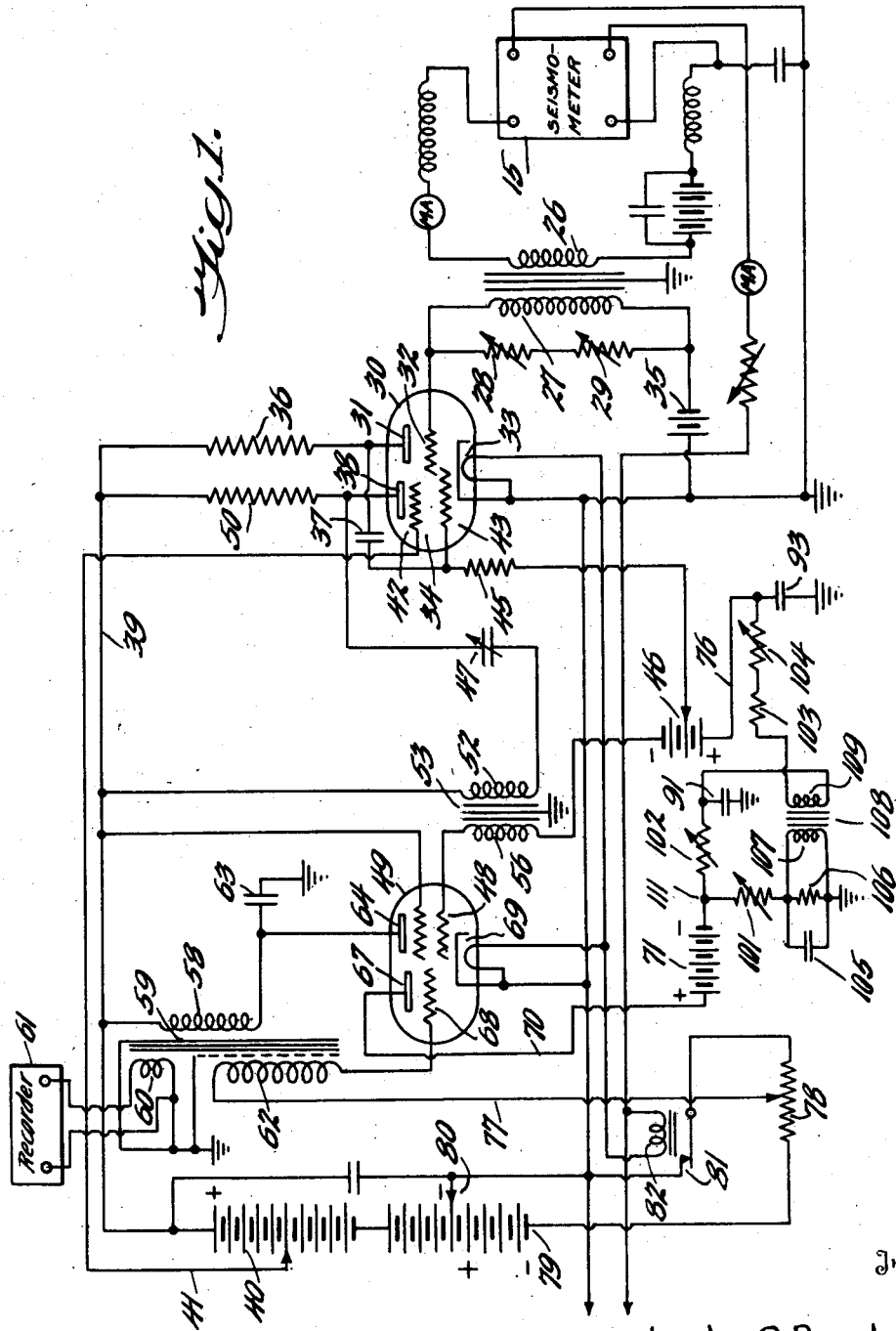

Inventor
Josephus O. Parr, Jr.

Patented Sept. 4, 1945

2,384,393

UNITED STATES PATENT OFFICE 2,384,393

STABILIZER FOR AUTOMATIC VOLUME CONTROL CIRCUITS

Josephus O. Parr, Jr., San Antonio, Tex., assignor to Olive S. Petty, San Antonio, Tex.

Application August 4, 1943, Serial No. 497,371

9 Claims. (Cl. 179—171)

This invention relates to methods of and apparatus for conducting seismic surveys for use in connection with geophysical prospecting, and more particularly to apparatus and methods for amplifying and recording the seismic wave trains as they arrive at one or more reception points.

In the amplification and recording of seismic energy, it is customary practice to provide means for automatically regulating the sensitivity of the amplifying and recording equipment in order that waves of widely varying amplitude may all be received and recorded by sensitive apparatus on a record sheet or other medium of convenient dimensions. I have described one such an arrangement in my prior application for United States Letters Patent Serial No. 411,479, filed September 19, 1941, the circuit shown therein being basically similar to that illustrated and described in the patent issued jointly to Olive S. Petty and me, No. 2,318,624, granted May 11, 1943. The prior application and patent both disclose, in association with a seismometer or other device for converting seismic impulses into electrical wave form signal energy, an amplifier for such signal energy, the degree of amplification effected in the amplifier being automatically regulated in response to change in amplitude of the received seismic waves.

Each of these disclosures further includes a showing of means whereby the regulation of amplifier sensitivity following a given change in amplitude of received energy is somewhat retarded, so as to reduce the distortion of the record which would otherwise result. While the introduction of some time delay circuit for this purpose is altogether desirable, it is usually preferable to retard the application of sensitivity control no more than is absolutely necessary to prevent serious distortion of the record, since it is obvious that prolonged delay in the reduction of sensitivity following the arrival of signals of excessive amplitude inevitably permits the signal energy to build up to amplitudes which cannot be recorded on a record sheet of limited width, and a portion of the record is therefore sacrificed before the amplifier sensitivity can be reduced.

It is accordingly an object of the present invention to provide a method and means whereby the application of sensitivity control, or automatic volume control, is effected with a minimum of delay following an increase in amplitude of the incoming signal energy of sufficient magnitude to require such compensation.

More specifically, it is an object of the invention to provide, in an amplifier of the type in which automatic gain control is effected by the application to an amplifier valve grid of a potential derived from the signal energy, means for minimizing the distortion normally resulting from prompt application of the controlling potential to the grid.

The basis of the present invention is the discovery that the principal source of distortion in amplifiers of the type described is the result of feeding to the control grid of the amplifier valve a potential or bias on which is superimposed a pulsating voltage, sometimes referred to as a ripple component, caused by deriving the bias from the rapidly oscillating signal energy. In my aforesaid application and patent, the time delay circuit hereinbefore referred to serves as a filter to reduce substantially the effect of the ripple component. However, any reduction in the size of the condensers employed in the filter tends to increase the effect of the ripple component, and since this ripple component is then amplified by one or more stages of amplification following the controlled valve, and is again returned to the AVC circuit to further increase the control potential, the effect of the ripple component is gradually increased during the reception of signal energy of large amplitude, until a condition of oscillation is approached, with the result that the distortion is excessively large.

I have found that the ripple component may be minimized and substantially eliminated by the use of an additional circuit, supplied with energy from the amplifier, and so constructed and arranged as to combine with the current which supplies the control bias a pulsating current of comparable magnitude and opposite phase, whereby the ripple component is substantially cancelled. For example, a portion of the energy in the A. V. C. circuit may be applied to a transformer which passes the superimposed pulsating current, the output of the transformer being so returned to the A. V. C. circuit as to provide a voltage which is combined with the ripple component in phase opposition. I have discovered that with such an arrangement the time delay in the application of the control voltage to reduce the sensitivity of the amplifier valve may be maintained quite low without objectionable distortion of the record and by the use of apparatus which is simple and inexpensive and which permits of changing the design of the usual A. V. C. circuit to reduce the cost thereof, for example by the use of smaller condensers.

Figure 2:
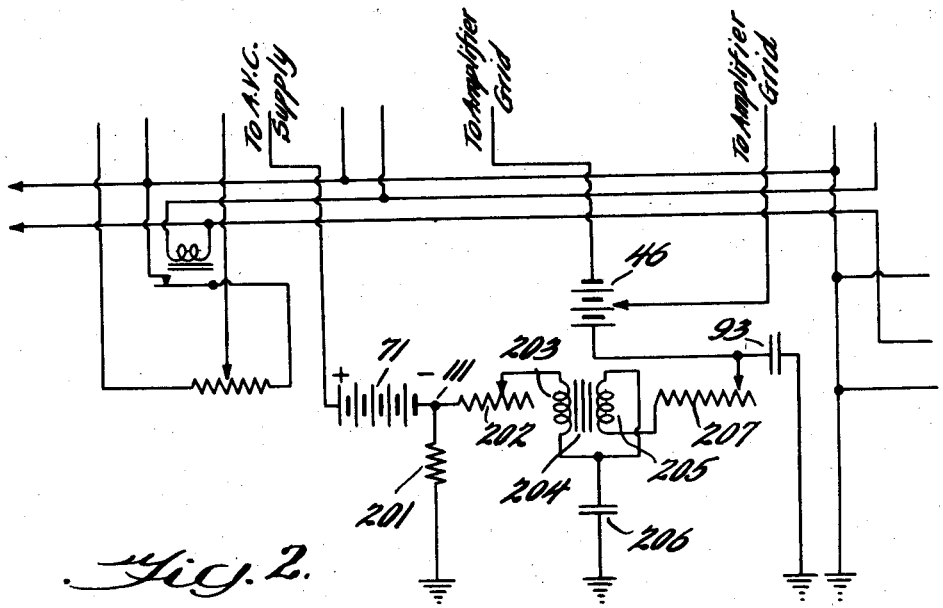
Figure 3:
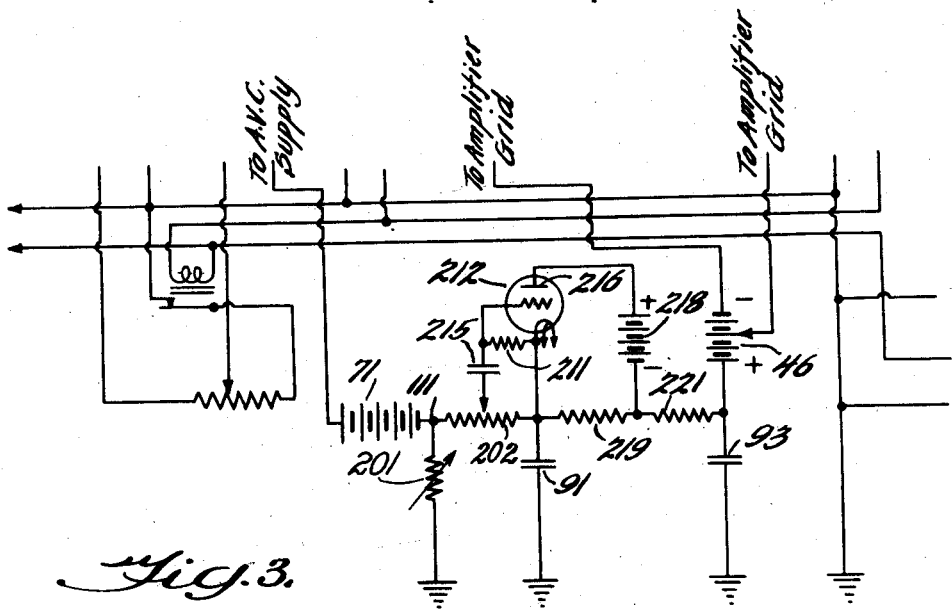

Further objects and features of the invention will be apparent from the following description taken in conjunction with the accompanying drawings in which:

Figure 1 is a wiring diagram of a system for the reception of seismic waves, illustrating one form of amplifier to which the invention may be applied; and Figures 2 and 3 illustrate modified forms of a part of the circuit shown in Figure 1.

For the purpose of illustration I have shown one method of applying the invention to a circuit essentially similar to that represented in my prior application and patent hereinbefore mentioned. It will be appreciated, however, that the invention is by no means limited to this type of circuit and that the underlying principle whereby the ripple component of a sensitivity control voltage is minimized or cancelled out by the combination therewith of a comparable pulsating voltage, out of phase with the original ripple component, may be utilized in conjunction with the widely varying types of seismic apparatus.

Referring now to Figure 1 of the drawings, there is shown a detector or seismometer 15 of any suitable type adapted to convert seismic energy to wave form electrical signals. These signals are fed into a suitable output circuit which includes the primary 26 of a transformer, the secondary 27 of which is shunted by a pair of variable resistors 28 and 29, one for coarse and one for fine adjustment, for manually setting the level of the signal applied to the amplifier.

The secondary 27 feeds into the cathode and grid of the thermionic valve 30 which constitutes a simple triode amplifier having the anode 31, grid 32, and heated cathode 33 which it shares in common with the elements of the second stage amplifier valve indicated at 34. A suitable biasing battery 35 is arranged in the grid circuit of the triode amplifier. This amplifier is coupled to the second stage amplifier by means of an anode coupling resistor 36 and condenser 37. The anode 31 as well as the anode 38 of the second stage valve receive their voltage supply through the common conductor 39 connected to the positive end of the battery 40. A tap 41 in this battery supplies the screen grid 42 of the second stage amplifier with a somewhat lower potential, permitting more gain and improved automatic volume control. The control grid 43 of the second stage amplifier is coupled by the condenser 37 to the anode of the first stage and receives its bias through resistor 45 from a tap on battery 46. An adjustable coupling condenser 47 and anode resistor 50 provide the coupling between the second stage anode 38 and the control grid 48 of the third stage amplifier valve 49. Condenser 47 acts in the nature of a filter, first to avoid flow of anode current through the primary winding 52 of the interstage coupling transformer 53, thus increasing the transformer life and permitting its design to be more efficient, and second, to vary the frequency response of the amplifier, giving it the highest gain on the desired frequencies and very low gain on undesired frequencies, which effect comes from resonating the transformer primary.

The secondary winding 56 of the interstage transformer 53 connects between the control grid 48 and the bias battery 46. The output from the third stage is fed through the primary 58 of transformer 59, one secondary 60 of which delivers the amplified waves to the moving element of a galvanometer associated with and forming part of a recorder 61. Another secondary 62 takes off a portion of the output of the amplifier for supply to the automatic volume control valve as will be further described hereinafter. The condenser 63 between the anode 64 of the third stage valve and ground serves to by-pass high frequencies and to resonate the output transformer to assist in the desired filter action. At the same time, this condenser performs the important function of assisting in the damping of the moving element of the galvanometer.

In the same envelope with valve 49 is a triode, which may for convenience be referred to as the A. V. C. valve, comprising anode 67, grid 68, and the common heated cathode 69 which functions also with the elements of the third stage amplifier. The anode 67 is connected by wire 70 to a separate source 71 of anode voltage, the negative pole of which leads through variable resistors 102, 103 and 104, and to ground through condensers 91 and 93 and through resistors 101 and 106.

The grid 68 of the A. V. C. valve is fed from the secondary 62 of the output transformer 59, the opposite end of which is connected by conductor 77 to the slider of a potentiometer 78 energized from the portion of battery 46 between negative terminal 79 and adjustable tap 80, through the contacts 81 of a relay, the winding 82 of which is in series with the heaters of valves 30 and 49.

The slider on the potentiometer 78 is set to supply a sufficiently negative bias to the control grid 68 of the A. V. C. valve to normally prevent the flow of any anode current in that valve. Preferably the valve is thus biased substantially beyond cut-off, and flow of anode current occurs only during positive swings of the output signal of sufficient magnitude to drive the grid across the cut-off point toward the positive side. Thus whenever the positive potential supplied from the transformer winding 62 becomes sufficiently high, the grid will permit the flow of current to anode 67.

It will be seen that when no current is flowing in the anode circuit of the A. V. C. valve, the positive pole of battery 46 is substantially at ground potential. The bias on grids 43 and 48 of the second and third stage amplifier valves is therefore determined by the potential of the battery 46 and the gain of the amplifier is fixed thereby. However, when current flows in the anode circuit of the A. V. C. valve through the resistors 102, 103 and 104, and through resistors 101 and 106, the potential of the conductor 76 becomes negative with respect to ground, and the bias on the grids 43 and 48 is thereby rendered more negative to reduce the gain of the amplifier.

It has already been explained how the reception of waves of greater amplitude than a predetermined value causes functioning of the A. V. C. valve. If this value is set at approximately the amplitude of the first received reflected waves, then the operation of the A. V. C. will cease when the reflected waves begin to arrive at the seismometer and if not means are taken to prevent it, the gain of the amplifier will become normal for the remainder of the operation. This is not desirable since the setting for the original gain would have to be sufficiently low to maintain the first portion of the reflected waves at a reasonable size and the later portion would then be too small for use. The normal gain is therefore set to produce a greater than necessary output from the first of the reflected waves to arrive. The gain is prevented, however, from returning to normal after being reduced by the large primary waves until close to the end of the whole record.

Thus on the arrival of the earlier waves of excessively large amplitude, the grid 68 of the A. V. C. valve is driven sufficiently positive by the signal energy derived from the output transformer secondary 62 to cause a flow of current to the anode 67, thereby charging the condensers 91 and 93 and applying a more negative bias to the grids 43 and 48 of the amplifier valves to reduce the gain of the amplifier. The setting of the resistor 78 determining the bias on the A. V. C. valve should be such that each of the swings of the signals derived from these excessively large waves causes the A. V. C. valve to function and therefore the charging of condensers 91 and 93 continues until such waves have passed.

As hereinbefore indicated, the A. V. C. system just described, if operated in such a manner as to produce no noticeable distortion in the record, is sufficiently delayed in its action to prevent rapid reduction of large voltage swings. Should the action be too rapid, the ripple component is fed to the grids 43 and 48 of the amplifier valves and, after further amplification, is returned to the grid 68 of the A. V. C. valve and thence to the condensers 91 and 93, with substantially increased amplitude. As pointed out hereinbefore, this building up of the ripple component is a major factor in the distortion of the record, especially when it is attempted to reduce the time required to affect the sensitivity of the amplifier following the arrival of signals of high amplitude. One method which I have found to be extremely effective in reducing this ripple component to a minimum is shown in Figure 1 of the drawings, involving the introduction in the conduction path for the control signal, of the primary winding 109 of a transformer 108.

When the current of anode 67 increases or decreases a ripple voltage is fed through resistance 101 and will charge condenser 105. This voltage across winding 107 of transformer 108 will induce a voltage across winding 109. By proper selection of the constants, the ripple voltage appearing across winding 109 will be equal in magnitude and 180° out of phase with the ripple voltage appearing across condenser 91. Hence practically no ripple voltage will be fed through resistances 103 and 104 to condenser 93.

For all seismic frequencies, the impedance of resistor 101 should be quite large in comparison to the impedance of winding 107, which in turn should be quite large in comparison to resistor 106 and to the impedance of condenser 105. This condition is readily obtainable in seismic amplifiers since the resistance of 101 can be in the neighborhood of 500,000 ohms, the reactance of 107 at the lowest seismic frequencies may be 50,000 ohms, the resistance of 106 can be 5,000 ohms, and the reactance of 105 may be 500 ohms, these figures being given merely by way of example but representing effective and wholly practical conditions of operation. A further desirable condition is that the impedance of resistor 102 be quite large in comparison to the impedance of condenser 91. The condition for complete cancellation of the ripple component may be expressed by the following equation:
Condenser 105 (mfd.) × resistor 101 (ohms) = condenser 91 (mfd.) × resistor 102 (ohms) × turns ratio of windings 109 to 107.

As hereinbefore indicated, resistor 106 is not critical and may be omitted, but is preferably employed in order to obtain improved frequency response in the transformer. The circuit may be adjusted to a condition in which the ripple component is completely rejected by varying resistor 101, resistor 102, or both, in such manner as to satisfy the equation expressed above.

The operation of the circuit just described will be apparent since the load resistors 101 and 102 are large in comparison to the impedance of the condensers 105 and 91, and the current in both circuits will be in phase with the applied voltage. Consequently the ripple voltages appearing across these condensers are in phase with the voltage applied to the network between terminal 111 and the ground, and since this is true regardless of the frequency of the applied voltage, it is unnecessary to compensate for variation in frequency.

It may be noted that it is desirable that the impedance of winding 107 be large in comparison to the impedance of condenser 105, so that no appreciable phase angle shift will result from the introduction of the winding at this point. Resistors 103 and 104 may be employed to compensate for any slight departure from the conditions hereinbefore stated, and 104 if preferably variable so that the time constant may be adjusted.

It may be noted that the use of such a circuit in the A. V. C. filter will decrease the energy fed through the A. V. C. filter network at seismic frequencies (at which frequencies the main amplifier has maximum gain).

In the form of the invention shown in Figure 2 the major portion of the amplifier circuit has been omitted for simplification, only the essential part of the A. V. C. circuit being illustrated, and similar reference characters are employed to designate similarly functioning elements. In this embodiment of the invention, the negative terminal 111 of battery 71 is grounded through resistor 201 and is connected through variable resistor 202 to one winding 203 of a transformer 204. The winding 205 is connected to the winding 203 as shown, and this connection is applied to one plate of condenser 206, the other plate being grounded. The opposite end of winding 205 is connected through variable resistance 207 to the positive terminal of battery 46 and thence to the control grid of the amplifier valves as in the embodiment shown in Figure 1. Resistance 207 is also connected through condenser 93 to ground.

It will be appreciated that by suitable adjustment of the constants of this circuit the A. C. ripple flowing through winding 203 induces a corresponding ripple voltage in winding 205 which is 180 degrees out of phase with the ripple voltage applied to condenser 206 through winding 203, so that the pulsating current is substantially cancelled and practically no ripple voltage is applied to the amplifier grids. Variable resistor 207 may be adjusted to control the time constant. The circuit shown in Figure 2 is highly advantageous and economical, especially since the best results are secured by the use of a transformer 204 having a relatively high core loss at higher frequencies, and such a transformer is among the cheapest on the market.

In Figure 3 the circuit representation is similar to that followed in Figure 2, the major portion of the amplifier being omitted. In this figure the negative terminal 111 of battery 71 is grounded through variable resistor 201 and is connected to the cathode of thermionic valve 212 through resistance 202, the cathode being connected to ground through condenser 91. A variable tap on this resistance leads through condenser 215 to the grid of valve 212, which is suitably biased by resistance 211. The anode 216 of the valve is returned to the cathode through battery 218 and resistor 219, and the negative terminal of the battery is connected to the positive terminal of battery 46 through resistor 221.

Since there is normally a plate current flowing in valve 212 which produces a voltage drop across resistor 219, the negative terminal of battery 218 is negative with respect to ground and with respect to the valve cathode. When a negative ripple component is applied at the negative terminal of battery 71, a part of this component is fed through the slider on resistance 202 and through condenser 215 to the grid of the valve, thus reducing the anode current and the voltage drop in resistor 219. The ripple voltage applied to condenser through resistor 202 is thus cancelled out.

It will be appreciated from the foregoing that the present invention improves sensitivity control of seismic amplifiers in a number of respects, including stabilization of the A. V. C. circuit, reduction of distortion due to the operation of the A. V. C. while permitting shortening of the time constant thereof, reduction of the number of valves and accessory equipment required to lessen distortion by other methods, and general simplification of the circuit while obtaining improved results.

Having thus described the invention, what is claimed as new and desired to be secured by Letters Patent is:

1. In apparatus for use in seismic surveying employing a seismometer for converting incoming seismic energy into electrical wave form signals, the combination with means for amplifying and recording such signals, said amplifying means including thermionic valve amplifiers, of means for applying to a control grid of at least one of said amplifiers a bias voltage varying automatically in response to variation in amplitude of incoming energy so as to maintain the major portion of the record within usable amplitude limits, said last named means including devices deriving the bias voltage from the signal energy, and means operable by the signal energy for applying to said devices a pulsating voltage substantially in phase opposition with the ripple component of said charge and of comparable magnitude, whereby distortion of the record resulting from the feeding to the control grid of said ripple component is minimized.

2. In apparatus for use in seismic surveying employing a seismometer for converting incoming seismic energy into electrical wave form signals, the combination with means for amplifying and recording such signals, said amplifying means including thermionic valve amplifiers, of means for applying to a control grid of at least one of said amplifiers a bias voltage varying automatically in response to variation in amplitude of incoming energy so as to maintain the major portion of the record within usable amplitude limits, said last named means including a condenser connected to supply the bias voltage to said grid, and devices deriving from the signal energy a biasing charge and applying such charge to said condenser, and means operable by the signal energy for combining with said charge a pulsating voltage in substantial phase opposition with the ripple component of said charge and of comparable magnitude, whereby distortion of the record resulting from the feeding to the control grid of said ripple component is minimized.

3. In apparatus for use in seismic surveying employing a seismometer for converting incoming seismic energy into electrical wave form signals, the combination with means for amplifying and recording such signals, said amplifying means including thermionic valve amplifiers, of means for applying to a control grid of at least one of said amplifiers a bias voltage varying automatically in response to variation in amplitude of incoming energy so as to maintain the major portion of the record within usable amplitude limits, said last named means including a circuit operable in response to increase in signal amplitude above a predetermined value for deriving said bias voltage from the signal energy, and means operable by energy flowing in said circuit for applying to said circuit a pulsating voltage in substantial phase opposition with the ripple component of said bias voltage and of comparable magnitude, whereby distortion of the record resulting from the feeding to the control grid of said ripple component is minimized.

4. In apparatus for use in seismic surveying employing a seismometer for converting incoming seismic energy into electrical wave form signals, the combination with means for amplifying and recording such signals, said amplifying means including thermionic valve amplifiers, of an A. V. C. circuit deriving energy from said signals for applying to a control grid of at least one of said amplifiers a bias voltage varying automatically in response to variation in amplitude of incoming energy above a predetermined minimum value so as to maintain the major portion of the record within usable amplitude limits, and means operable by energy flow in said A. V. C. circuit for applying to said circuit a pulsating voltage in substantial phase opposition with the ripple component of said bias voltage and of comparable magnitude, whereby distortion of the record resulting from the feeding to the control grid of said ripple component is minimized.

5. In apparatus for use in seismic surveying employing a seismometer for converting incoming seismic energy into electrical wave form signals, the combination with means for amplifying and recording such signals, said amplifying means including thermionic valve amplifiers, of an A. V. C. circuit deriving energy from said signals for applying to a control grid of at least one of said amplifiers a bias voltage varying automatically in response to variation in amplitude of incoming energy above a predetermined minimum value so as to maintain the major portion of the record within usable amplitude limits, and means operable by energy flow in said A. V. C. circuit for applying to said circuit a pulsating voltage in substantial phase opposition with the ripple component of said bias voltage and of comparable magnitude, whereby distortion of the record resulting from the feeding to the control grid of said ripple component is minimized, said last named means including a transformer having the primary winding thereof included in said circuit, and devices applying to said circuit the voltage developed in the secondary winding thereof.

6. In apparatus for use in seismic surveying employing a seismometer for converting incoming seismic energy into electrical wave form signals, the combination with means for amplifying and recording such signals, said amplifying means including thermionic valve amplifiers, of an A. V. C. circuit deriving energy from said signals for applying to a control grid of at least one of said amplifiers a bias voltage varying automatically in response to variation in amplitude of incoming energy above a predetermined minimum value so as to maintain the major portion of the record within usable amplitude limits, and means operable by energy flow in said A. V. C. circuit for applying to said circuit a pulsating voltage in substantial phase opposition with the ripple component of said bias voltage and of comparable magnitude, whereby distortion of the record resulting from the feeding to the control grid of said ripple component is minimized, said last named means including a transformer having the primary and secondary windings thereof included in series in said circuit and so connected that the current flow in one winding is opposed to the current induced therein by the other winding.

7. In apparatus for use in seismic surveying employing a seismometer for converting incoming seismic energy into electrical wave form signals, the combination with means for amplifying and recording such signals, said amplifying means including thermionic valve amplifiers, of an A. V. C. circuit deriving energy from said signals for applying to a control grid of at least one of said amplifiers a bias voltage varying automatically in response to variation in amplitude of incoming energy above a predetermined minimum value so as to maintain the major portion of the record within usable amplitude limits, and means operable by energy flow in said A. V. C. circuit for applying to said circuit a pulsating voltage in substantial phase opposition with the ripple component of said bias voltage and of comparable magnitude, whereby distortion of the record resulting from the feeding to the control grid of said ripple component is minimized, said last named means including a thermionic valve having a control grid supplied with voltage from said circuit, and means delivering the output of said valve to said circuit.

8. In apparatus for use in seismic surveying employing a seismometer for converting incoming seismic energy into electrical wave form signals, the combination with means for amplifying and recording such signals, said amplifying means including thermionic valve amplifiers, of means for applying to a control grid of at least one of said amplifiers a bias voltage varying automatically in response to variation in amplitude of incoming energy so as to maintain the major portion of the record within usable amplitude limits, said last named means including a triode valve having a control grid fed with a voltage derived from said amplifier, and a condenser charged by the output of said triode valve and supplying control voltage to the grid of said amplifier, and means energized by the output of said triode for returning to said output pulsating energy in phase opposition to said ripple component.

9. In apparatus for use in seismic surveying employing a seismometer for converting incoming seismic energy into electrical wave form signals, the combination with means for amplifying and recording such signals, said amplifying means including thermionic valve amplifiers, of means for applying to a control grid of at least one of said amplifiers a bias voltage varying automatically in response to variation in amplitude of incoming energy so as to maintain the major portion of the record within usable amplitude limits, said last named means including a triode valve having a control grid fed with a voltage derived from said amplifier, and a condenser charged by the output of said triode valve and supplying control voltage to the grid of said amplifier, and means energized by the output of said triode for returning to said output pulsating energy in phase opposition to said ripple component, said last named means comprising a transformer having a primary winding in series in the output circuit of said triode valve.

JOSEPHUS O. PARR, JR.